United States Patent [19]
Curtis

[11] 4,267,130
[45] May 12, 1981

[54] PORTABLE AUXILIARY COOLING TOWER

[76] Inventor: Harold D. Curtis, Rte. 2, Chickasha, Okla. 73018

[21] Appl. No.: 66,926

[22] Filed: Aug. 16, 1979

[51] Int. Cl.³ .............................................. B01F 3/04
[52] U.S. Cl. ..................................... 261/112; 180/41; 261/109; 261/160; 261/DIG. 11; 261/DIG. 79
[58] Field of Search ............................... 261/109–112, 261/151, DIG. 4, DIG. 11, DIG. 77, DIG. 79, 158–161; 180/41

[56] References Cited

U.S. PATENT DOCUMENTS

| | | | |
|---|---|---|---|
| 1,986,653 | 1/1935 | Wade | 261/DIG. 11 |
| 2,010,980 | 8/1935 | Coulson | 261/DIG. 11 |
| 2,606,008 | 8/1952 | Lau Bach | 261/151 |
| 2,680,603 | 6/1954 | Taylor | 261/DIG. 11 |
| 2,889,584 | 6/1959 | De Flon | 261/DIG. 11 |
| 3,494,109 | 2/1970 | Blazer et al. | 261/DIG. 11 |
| 3,572,657 | 3/1971 | Bradley, Jr. | 261/111 X |
| 3,792,841 | 2/1974 | Munters | 261/112 |
| 3,880,964 | 4/1975 | Fordyce et al. | 261/111 |
| 3,903,217 | 9/1975 | Heneby et al. | 261/111 |

FOREIGN PATENT DOCUMENTS 2360059  2/1978  France ............................... 261/109

*Primary Examiner*—Richard L. Chiesa
*Attorney, Agent, or Firm*—James H. Chafin

[57] ABSTRACT

A portable auxiliary cooling tower which is transportable over-the-highway for temporary or permanent use at a desired site. The tower is typically constructed on a trailer frame and is designed to provide maximum air flow for maximum cooling to temporarily replace or supplement larger fixed cooling tower cells. Another use of the portable cooling tower is to aerate stock ponds, chemical holding ponds and the like.

11 Claims, 12 Drawing Figures

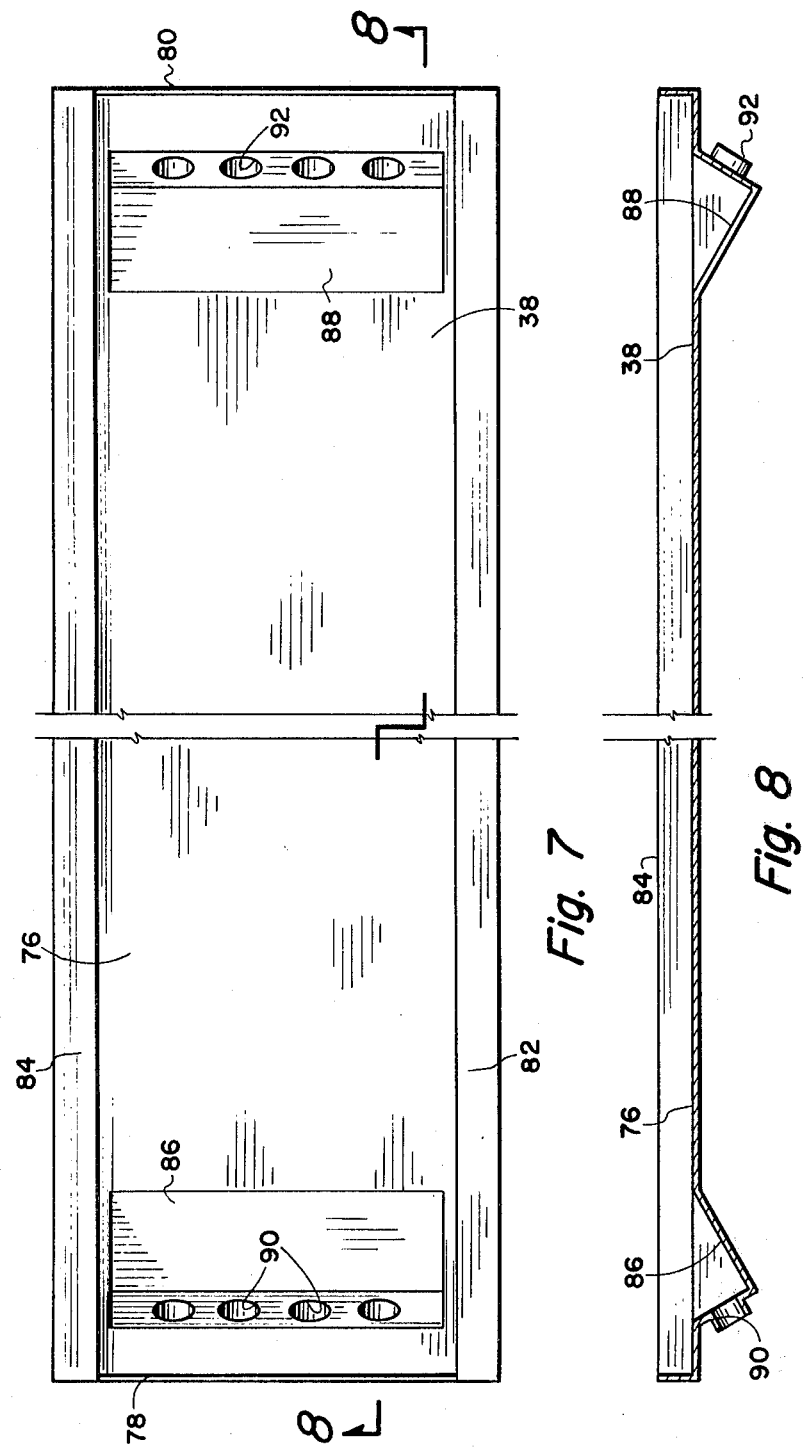

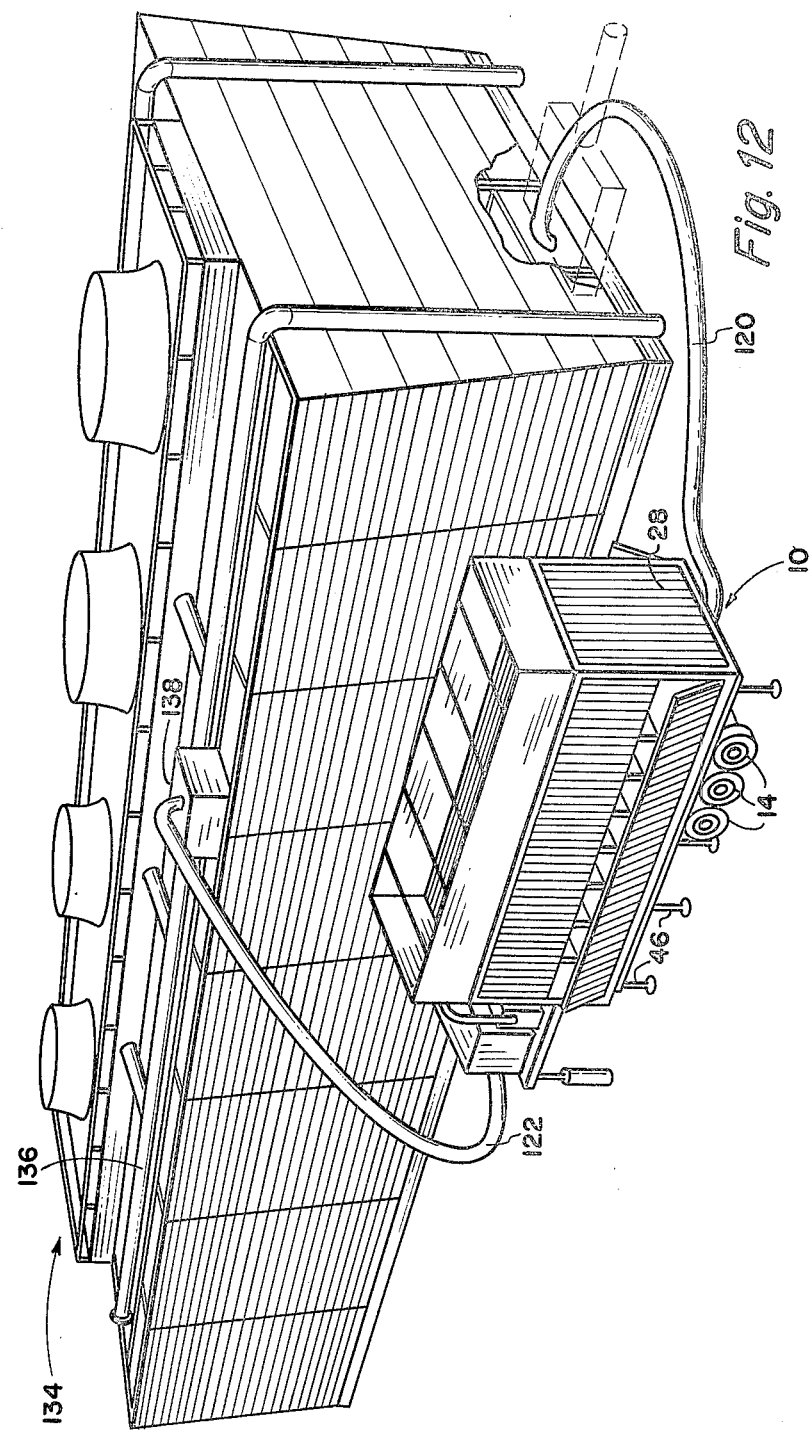

PORTABLE AUXILIARY COOLING TOWER

BACKGROUND OF THE INVENTION

I. Field of the Invention

The present invention relates to liquid-air cooling towers and more particularly, but not by way of limitation, to a portable cooling tower to temporarily replace or supplement fixed cooling towers while such towers are down for repairs or experiencing peak-load cooling requirements beyond their capability.

II. History of the Prior Art

Industrial cooling towers are typically sized to cope with average or mean temperature and cooling requirements expected throughout the seasons. To design for maximum possible conditions would constitute over design and is cost prohibitive since such maximum conditions are normally only experienced for a few days out of the year.

However, during those days in which maximum conditions occur, the industrial tower simply cannot produce the cooling required often resulting in loss to the users through inefficiency of employees in the case of air conditioning systems, or even loss of perishable products in cold storage applications or the loss of product in the petro-chemical refining processes.

Another inherent problem arises when all or part of the fixed cooling tower must be shut down for maintenance or repairs. Not only insufficient cooling is provided during those times but often cooling tower maintenance crews must work in a wet environment, which gives rise to safety and health considerations.

Typically, fixed industrial cooling towers are designed for maximum cost efficiency. To produce a cost efficient system requires consideration of several variables including the trade-off of maximum cooling with minimum loss of cooling water. Make-up water for such systems is expensive not only in the cost of the water itself, but primarily due to the chemical treatment of the water to reduce algae, solid mineral build-up and the like.

SUMMARY OF THE INVENTION

The present invention contemplates the construction and use of a portable cooling tower which is particularly designed to provide maximum cooling within a housing that is compatible with highway vehicle requirements so that the tower may be moved along the highway to sites requiring supplemental cooling.

Whereas the liquid flow capacity of the average cell in an industrial cooling tower may be 5,000 to 7,000 gallons per minute and the average cell may be 36 feet by 36 feet by 40 feet high, with a cooling capacity of 40 million BTU per hour, the present invention will operate with a liquid flow rate of approximately 3,000 gallons per minute and produce the same BTU per hour cooling output.

It is pointed out that there is some sacrifice of cost efficiency in the present invention. However, the goal of the present invention is to be able to pull one or more portable units alongside an existing fixed cooling tower and for a relatively short period of time, provide the cooling requirements of the fixed tower.

The portable tower comprises features which are particularly designed for use with existing towers. The portable tower is typically a counter-flow tower having a mobile-mounted housing with a cold-water catch basin in the bottom thereof and a plurality of spaced cold-water sumps in the bottom of the catch basin.

Above the catch basin is what amounts to a baffled plenum chamber for the introduction of outside air. The outside air is pulled into the plenum chamber through a pair of elongated oppositely disposed side ports which are provided with louver panels. The panels are hinged along the bottom and are typically open to an angle of approximately 70° which avoids picking up ground dust and debris by reason of the rather extreme air draft that will be pulled through the system.

At least one elongated vertical wind break panel is provided along the length of the plenum chamber to prevent high cross winds from blowing through and carrying water out of the tower.

A layer of packing material is laid in above the plenum chamber for filming the water during the cooling operation. A plurality of closely spaced blowers with associated spray nozzles are located directly above the packing for pulling a strong draft through the packing and for creating efficient distribution of water over the upper surface of the packing material.

A drift eliminator assembly is provided above the blowers for stripping out water particles carried by or entrained in the air which is exiting the tower. The drift eliminator assembly comprises a set of directionable blades which can be oriented to direct the exiting hot air or exhaust air away from the fixed cooling towers since many such fixed units are of the cross-flow type and would be susceptible to drawing such hot air into their system.

A plurality of foldable panels are provided around the periphery of the top of the tower which are extendable to form an upwardly extending wall surrounding the top of the housing and which serves as a re-circulation averter. The re-circulation averter helps preclude the exhaust air from being drawn back into the side air introduction ports which would greatly reduce the efficiency of the tower.

The nozzles which are located between the drift eliminator panels and the packing are fed by a plurality of vertical riser pipes which are in turn, connected to a distribution header or manifold. The distribution header assembly is typically located along the plenum chamber and receives some pre-cooling due to the air flow therearound and the water falling from the packing material layer.

The distribution header is, in turn, connected to the outlet of a pumping system which not only serves to draw liquid to be cooled into the tower but also drives the blowers hydraulically by use of that liquid. However, conventional motor-driven blowers may be used.

A plurality of spaced leveling jacks are carried by the lower portion of the housing in order to level the housing with respect to variable terrain encountered around the site of the fixed tower. The leveling jacks also permit adjustment of the elevation of the portable tower to provide enough height of the cold-water sumps with respect to the water dumping receptacle to insure gravity flow of the liquid from the catch basin.

There are many other uses for the portable tower in addition to those hereinbefore set forth such as using the tower to re-circulate water from farm ponds and the like in order to aerate the water and recharge the pond. Another use for the portable cooling tower is that of aerating industrial waste ponds and the like.

DESCRIPTION OF THE DRAWINGS

Other and further advantageous features of the present invention will hereinafter more fully appear in connection with a detailed description of the drawings in which:

FIG. 7 is a plan view of the catch basin and cold-water sumps.

FIG. 8 is an elevational sectional view of the catch basin taken along the broken lines 8—8 of FIG. 7.

FIG. 9 is a perspective view depicting the tower in a first mode of operation.

FIG. 12 is a perspective view depicting the tower in a fourth mode of operation.

DESCRIPTION OF THE PREFERRED EMBODIMENTS

Figure 1:
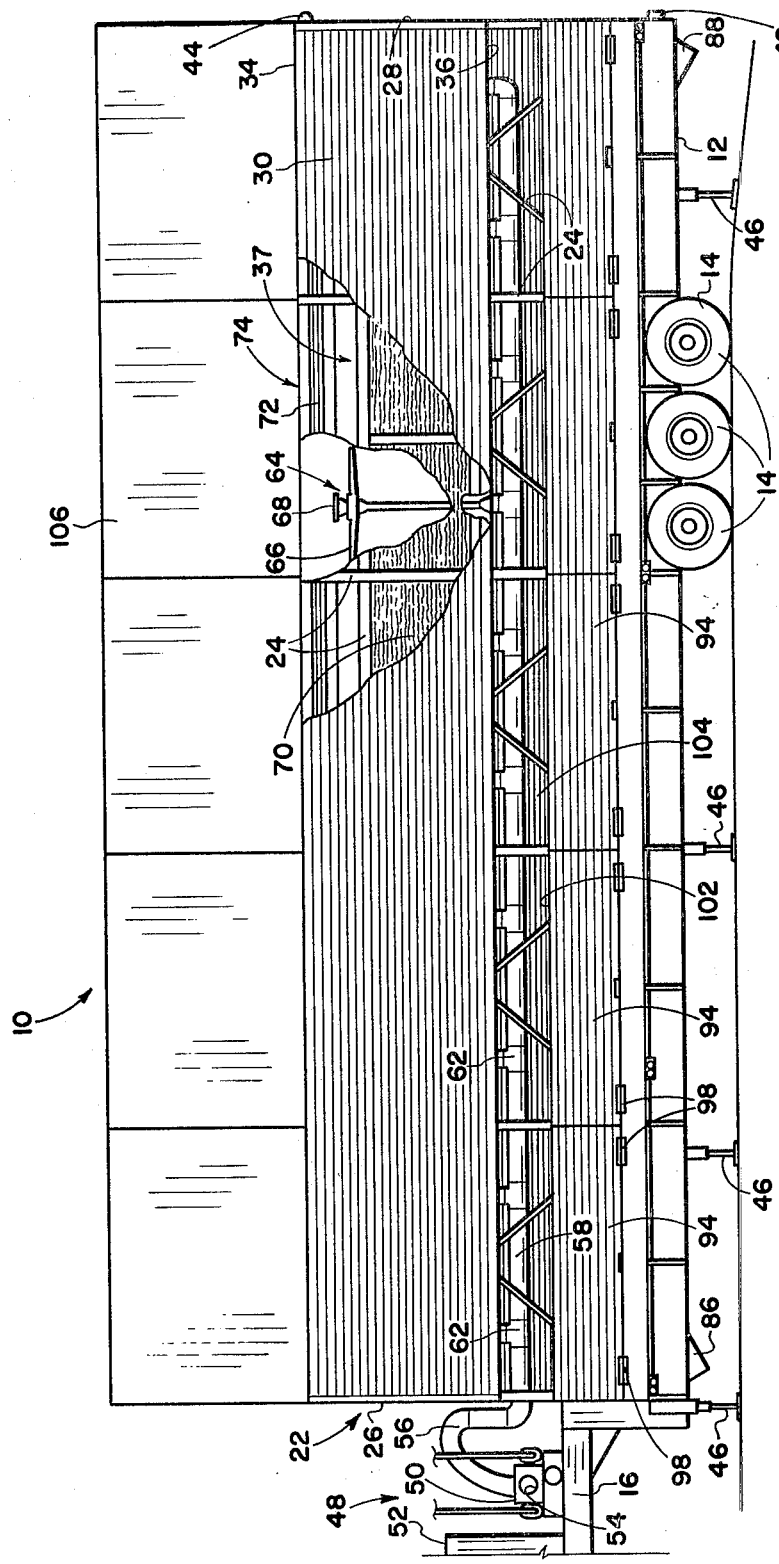
FIG. 1 is a side elevational view of a portable auxiliary cooling tower embodying the present invention.

Referring to the drawings in detail, reference character 10 generally indicates a portable auxiliary cooling tower which is mounted on an elongated rectangular base frame member 12. The frame member 12 is supported near the rear end thereof by a plurality of axial mounted wheel members 14 which are suitable for pulling the frame member 12 and associated cooling tower along the highway as will be hereinafter set forth.

The front end of the frame member 12 is provided with a forwardly extending platform 16, the platform being provided with a suitable trailer hitch assembly 18 for attachment for towing to a tractor vehicle generally indicated by reference character 20.

Attached to the frame 12 is the cooling tower housing generally indicated by reference character 22 and which primarily comprises a frame network 24. The housing is provided with front and back closed wall members 26 and 28 respectively. A pair of oppositely disposed sidewall members 30 and 32 extend along the entire length of the housing from the top 34 downwardly just past the midpoint to a bottom portion of the sidewalls indicated by reference character 36 in FIG. 1. The enclosed volume between the front and back walls 26 and 28 and the upper sidewalls 30 and 32 form what will be referred to as the cooling chamber 37 and will be hereinafter more completely described in detail.

Figure 5:
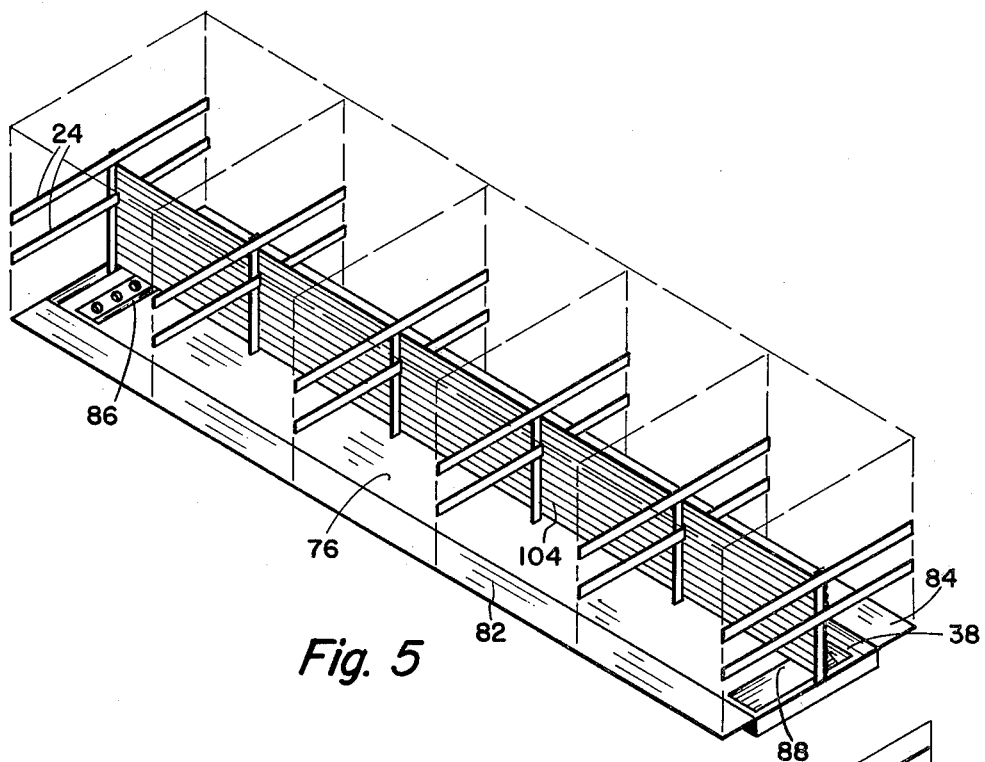
FIG. 5 is a perspective partial view of the wind break detail of the tower.
Figure 6:
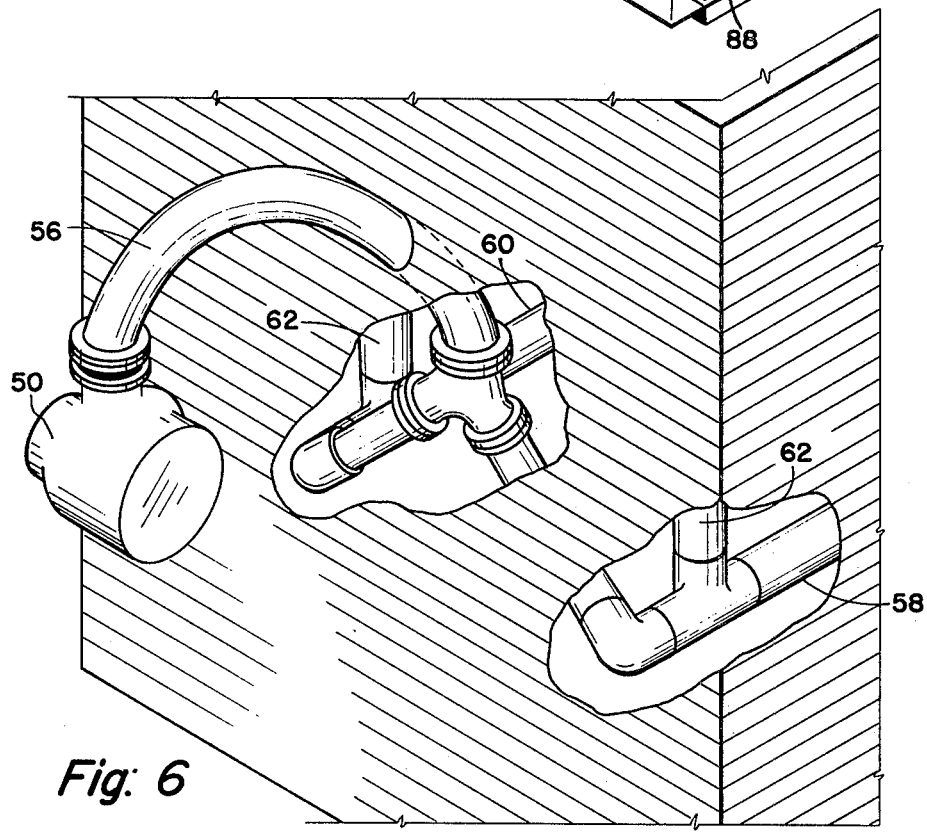
FIG. 6 is a perspective partial view of the liquid distribution system.

Supported directly by the base frame 12 is a liquid catch basin 38 which can be more clearly seen in FIGS. 5, 7 and 8. The volume above the catch basin 38 and below the cooling chamber 37 will be hereinafter referred to as a plenum chamber generally indicated by reference character 40. The housing 22 is further equipped with tail lights 42 and clearance lights 44 as needed for ordinary highway use.

A plurality of adjustable jacks 46 are secured to the base frame member 12 for leveling the frame with respect to uneven terrain and also for adjusting the elevation of the entire auxiliary cooling tower after it has been placed on site for operation.

Mounted on the forward platform 16 of the frame member is a pumping system generally indicated by reference character 48 and consists generally of a motorized pumping unit 50 and a fuel tank 52 for operating the pump motor. The pump also includes an inlet port 54 for pulling the liquid into the pump as will be hereinafter set forth and an outlet header pipe 56 for pumping that liquid into the auxiliary cooling tower.

The liquid being pumped is introduced into the cooling tower by means of a pair of elongated header pipes 58 and 60 which extend substantially the entire length of the plenum chamber 40. Spaced along each header pipe 58 and 60 are a plurality of riser pipes 62 which extend upwardly into the cooling chamber 37.

At the top of each riser pipe 62 there is a blower assembly generally indicated by reference character 64, each blower having horizontally disposed blade members 66 designed to push air upwardly and combined nozzle members 68 for spraying the liquid in a manner that will be hereinafter set forth.

Typically, the individual blowers are spaced apart as a part of the trade-off design criteria of a fixed tower to provide maximum air flow with minimum drift loss. However, it can be seen from the blower spacing of FIG. 9 that in constructing the present invention the blowers 66 are closely spaced to provide maximum cooling at the expense of some drift loss.

A substantial thickness of loose fill packing material 70 is attached to the frame work, the bottom portion of this packing material 70 forming the top of the plenum chamber 40. The top surface of the packing material 70 lies below the fan blade members 66 and nozzles 68.

Figure 2:
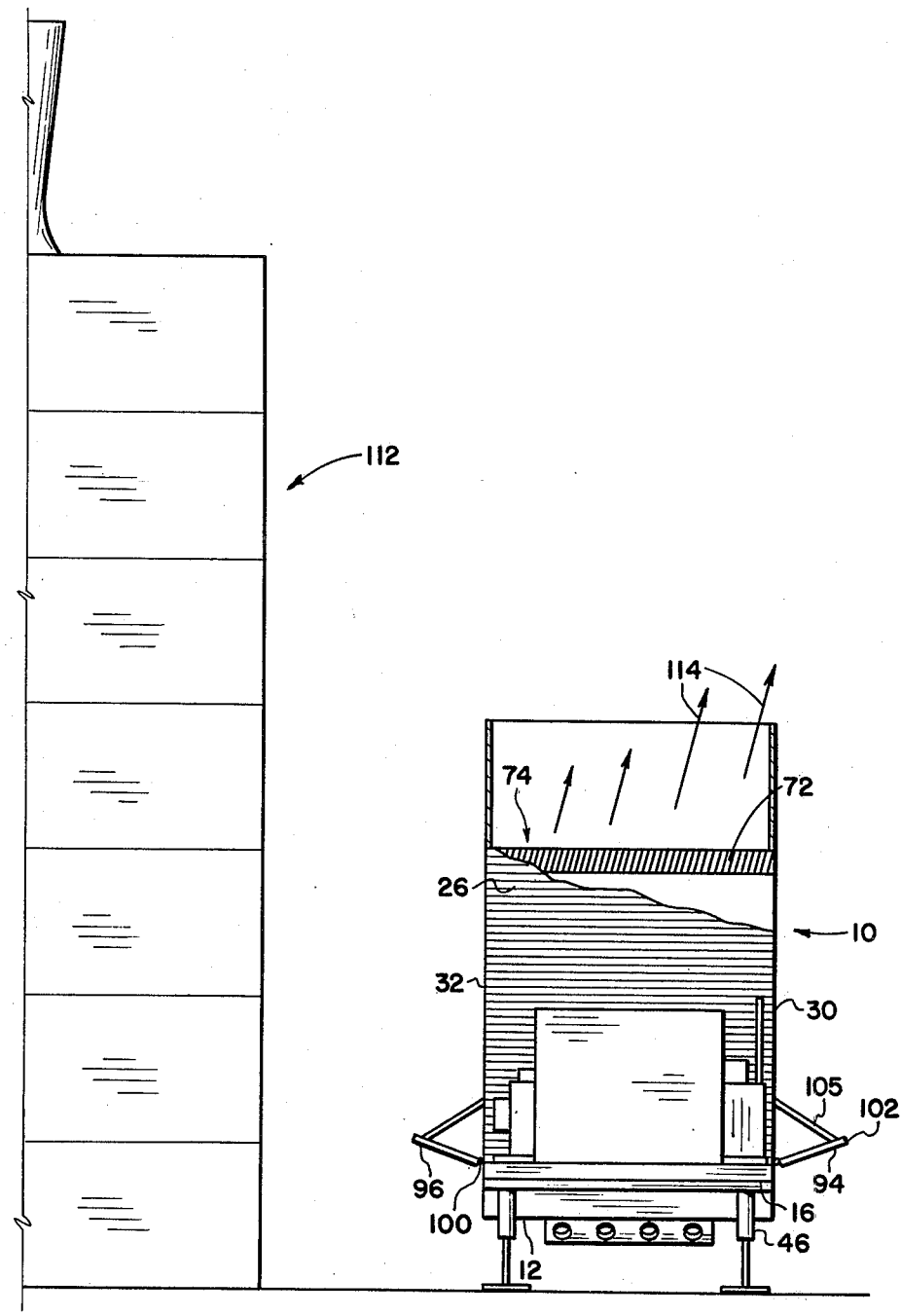
FIG. 2 is a front end elevational view of the tower.

A plurality of closely spaced drift eliminator blades 72 are provided just above the blower blade 60 and nozzles 68 to form a drift eliminator panel assembly generally indicated by reference character 74. The blades 72 are longitudinally arranged with respect to the cooling tower and are set at an angle as shown in FIG. 2 from the vertical whereby the air that passes through the drift eliminator assembly may be directed to one side or the other of the cooling tower. The purpose of directing the exiting air to one side or the other of the cooling tower is so that when the cooling tower is positioned next to a fixed cooling tower assembly, the exhaust air coming from the auxiliary cooling tower may be directed away from the fixed cooling tower.

Referring particularly to FIGS. 5, 7 and 8, the catch basin 38 comprises an elongated floor portion 76 closed at each end by end walls 78 and 80. The sidewalls are provided by a pair of outwardly extending longitudinal flange members 82 and 84 for accomodating the frame and wheel wells of the vehicle.

The floor 76 of the catch basin is provided with a pair of oppositely disposed cold-water sump recesses 86 and 88, each recess having a plurality of outlet ports 90 and 92, respectively, for removing the cooled liquid that will be caught by the catch basin.

The lower portion of the housing 22 of the auxiliary cooling tower is provided with a plurality of longitudinal louver panels 94 and 96. The lower edges of the louver panels 94 and 96 are attached to the housing by a plurality of hinge members 98 and 100, respectively. The height of the louver panels are such that when they are closed against the sidewalls of the cooling tower there is a gap between the upper edges 102 and the lower edges of the sidewalls 30 and 32. This gap between the louvers and the sidewalls exposes the plenum chamber 40 to the atmosphere even when the cooling tower is being pulled along the highway which aids in drying the system out when not in use.

When the louvers 94 and 96 are extended, they form an enlarged opening into the plenum chamber 40 for the introduction of air into the system for the cooling operation. These louvers 94 and 96 are normally extended to form an angle of approximately 70° with respect to the vertical sidewalls of the cooling tower and may be held in place by any well known manner such as by brace members 105. By setting the louvers 94 and 96 in this position, the louvers prevent dust and loose debris from being picked up from the ground or terrain and sucked into the system by means of the blowers.

An elongated longitudinal wind break panel 104 is vertically disposed within and runs the entire length of the plenum chamber 40. The wind break panel is for the primary purpose of preventing high cross-winds from traveling through the system and carrying away water which is falling from the packing layers 70 into the catch basin 38 and generally interfering with normal operation of the system.

Figure 3:
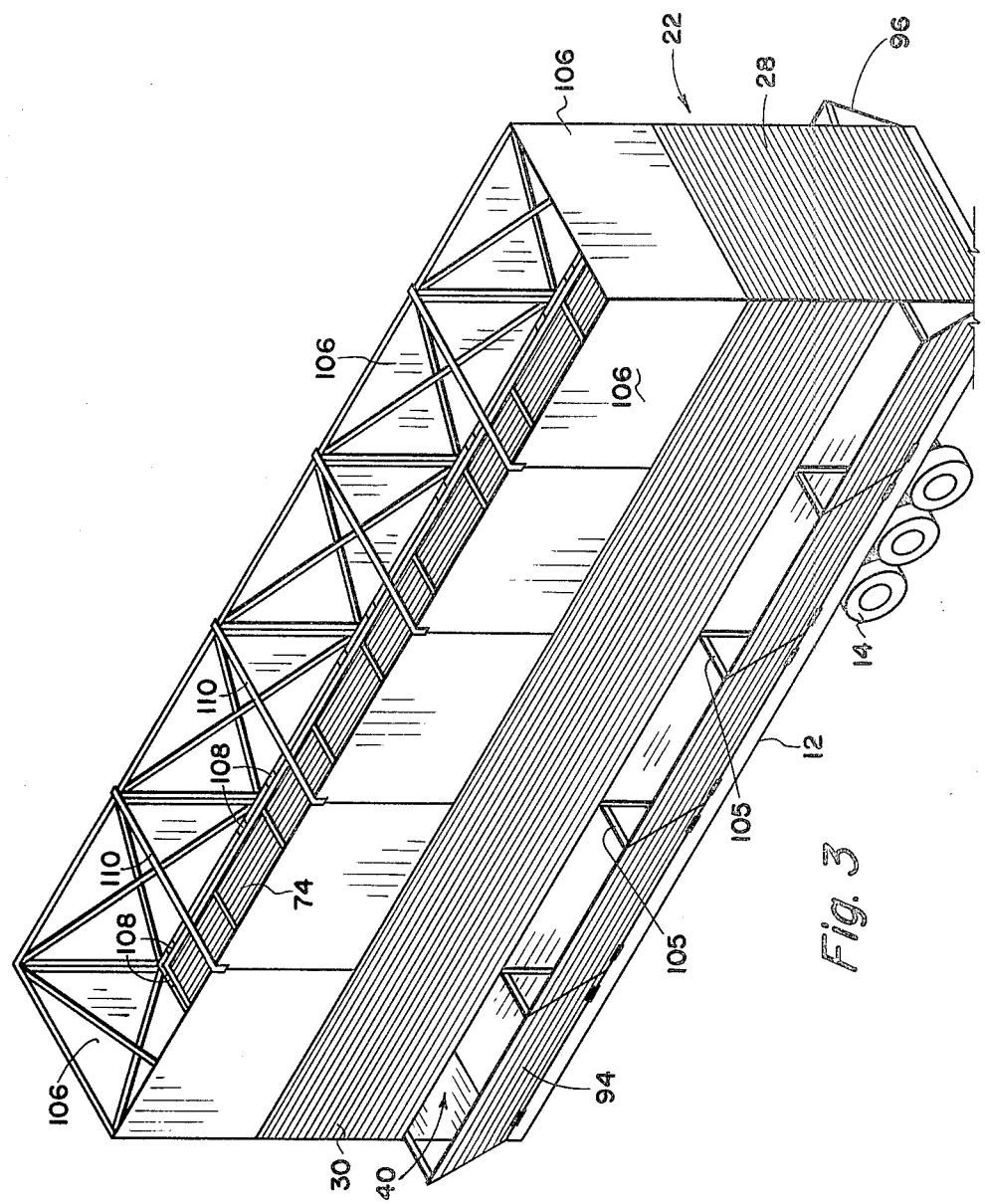
FIG. 3 is a perspective view of the tower.
Figure 4:
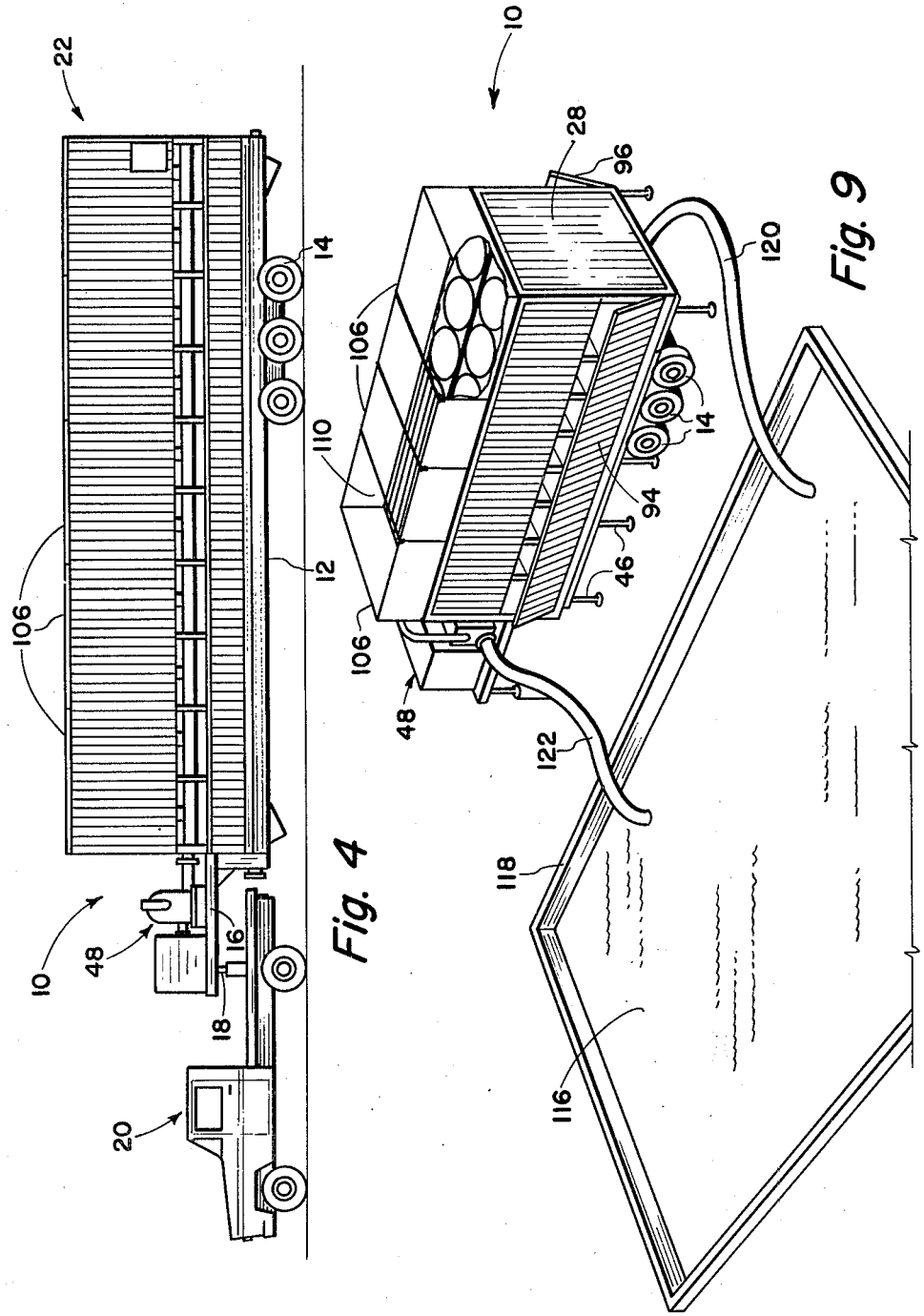
FIG. 4 is a side elevational view of the tower configured for highway travel.

A plurality of re-circulation averter panels 106 are provided around the outer periphery of the top of the housing 22 and are hingeably mounted along the top edges of the housing by a plurality of hinges 108. When the auxiliary cooling tower is configured for movement along the highways as shown in FIG. 4, the averter panels 106 are folded downwardly to form a top cover for the vehicle. When in use, the panels 106 are raised as shown in FIG. 3 to form extended sidewalls so that the exhaust air exiting the drift eliminator assembly 74 is moved upwardly by at least the height of the panels 106 to prevent this hot exhaust air from being drawn back into the plenum chamber 40 and caused to re-circulate which would decrease the efficiency of the system.

In order to maintain the panels 106 in their upright position during use, a plurality of cross-member braces 110 are provided which can be attached to the upper edges of the panels to hold them in the upright position during use. In order to fold the panels back down flush with the top of the vehicle as shown in FIG. 4, these cross-members 110 are removed and the panels may be folded in any well known manner.

Typically, in operation the auxiliary cooling tower may be utilized, as hereinbefore set forth, to supplement or temporarily replace all or a portion of fixed cooling towers when they are either down for maintenance or when cooling requirements exceed the capacity of these fixed towers.

Referring now to FIG. 2, the auxiliary cooling tower 10 is depicted as being positioned alongside a fixed cooling tower 112. Normally the auxiliary cooling tower 10 will be positioned so that the angle of the drift eliminator blades cause the exhaust air exiting the system to be forced away from the fixed cooling tower 112 as shown by the arrows 114.

Another use for the auxiliary cooling tower is to aerate liquid holding containers or ponds. Referring now to FIG. 9, the auxiliary cooling tower 10 is depicted as being placed alongside a liquid containing vat or holding pond 116 having sidewalls 118 therearound. After the auxiliary cooling tower 10 has been placed into position, the leveling jacks 46 are adjusted to level the system with respect to the terrain. The leveling jacks 46 are also utilized to raise the cooling tower to a level with respect to the level of the holding pond 116 and the surrounding wall 118 such that liquid may be returned from the auxiliary cooling tower to the pond by a gravity feed. A suitable flexible return line 120 is depicted as being attached to the cold-water sump 88 with the outer end thereof being extended over the holding pond wall 118 in order to return the liquid after it has passed through the cooling tower.

A liquid feed line 122 is then attached to the pump inlet port 54, the outer end being placed again into the liquid holding vat 116, the feed line 122 being considerably spaced from the return line 120.

The air inlet louvers 94 and 96 are then opened in order to provide a suitable air inlet port into the plenum chamber 40. The re-circulating averter panels 106 are then raised to an upright position and are fixed in the upright position by the cross members 110 to form upwardly extending sidewalls around the top of the cooling tower.

Liquid from the holding pond 116 is then pumped via the feed line 122 through the pump assembly 48 and into the header piping 58 and 60. The liquid then passes from the header piping 58 and 60 into the plurality of risers 62. The liquid, after being forced upwardly through the riser 62, serves to operate the blower blades 66, to start pulling air into the plenum chamber from the side ports and upwardly through the packing material 70, the air being exhausted out of the cooling tower through the drift eliminator assembly 74. The liquid also passes through the nozzles 68 and is sprayed over the entire upper surface of the packing layer 70.

As the water is being filmed through the packing layer 70, it comes into intimate contact with the air that is being drawn through the packing assembly in an upward direction by the blowers 66 thereby providing evaporative cooling of the liquid, the heat of the liquid being carried off by the exhaust air. As the air is being forced out of the top of the system, it will naturally carry with it some water droplets. This air then is forced into intimate contact with the drift eliminator assembly blades 72 wherein a significant amount of the water is stripped from the air and allowed to flow downwardly into the system.

The cool water exiting the bottom surface of the packing layer 70 falls downwardly into the catch basin 38 whereafter it flows by gravity through the cold-water sump 88, then through the return line 120 back into the liquid holding vat. It is also noted at this point that some precooling of the liquid takes place by the water falling from the packing layer 70 into and around the header piping 58 and 60. Naturally, outside air being drawn into the system is also passing the header piping 58 and 60 which also serves to help precool the liquid.

It should be kept in mind at this time that the holding pond or vat 116 could just as well be a farm pond that needs rejuvenating by aerating through the auxiliary cooling tower 10.

Figure 10:
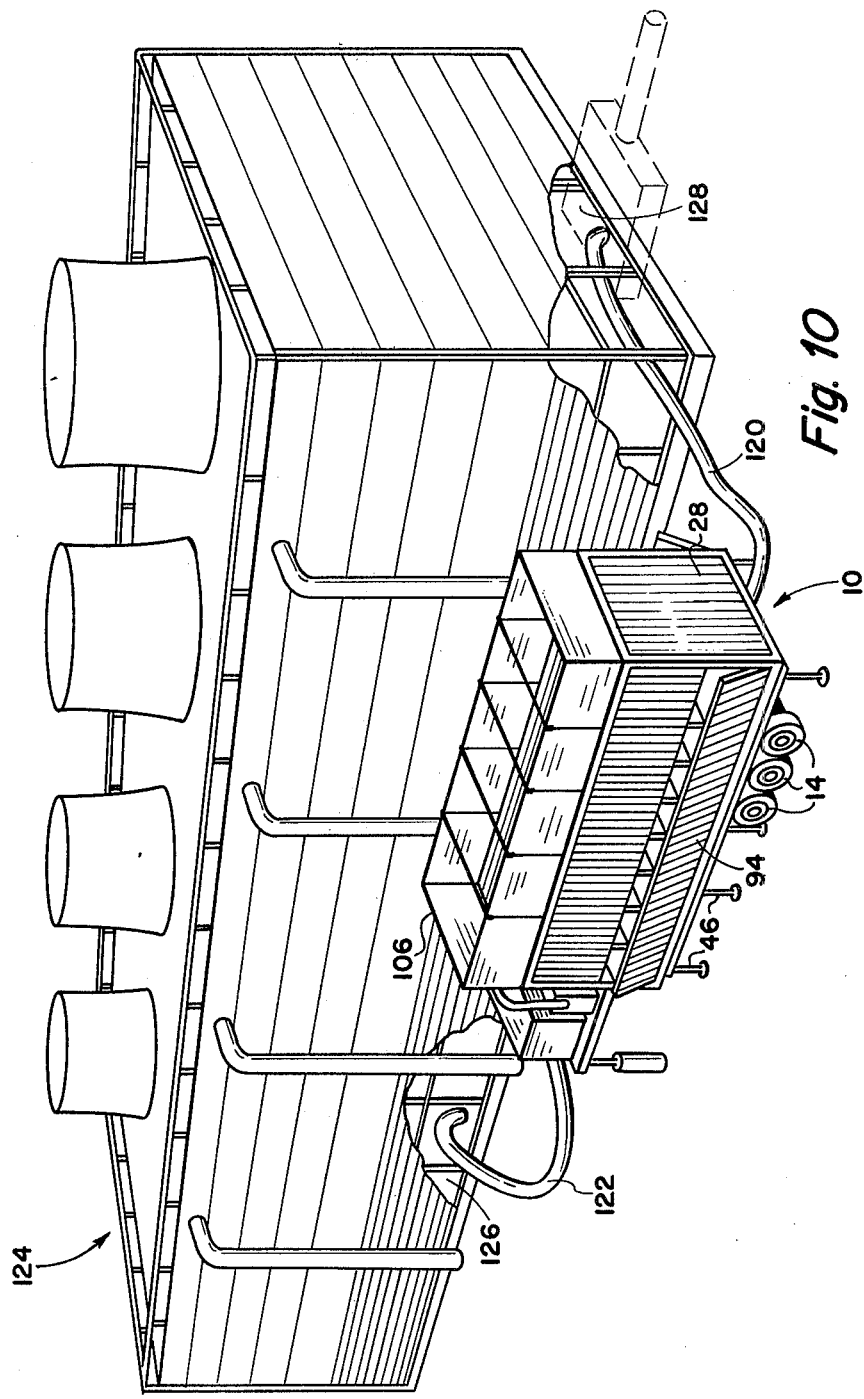
FIG. 10 is a perspective view depicting the tower in a second mode of operation.

Referring now to FIG. 10, the auxiliary cooling tower 10 is depicted alongside a large fixed cooling tower 124. In this case the set-up is similar to the set-up described in relation to the liquid holding vat 116 with the exception that care is taken at this point to assure that the cooling tower is oriented such that the drift eliminator blades 72 force the exhaust air outwardly away from the fixed tower 124.

The fixed tower 124 is depicted as having four cells having a common water basin 126 and a cold-water sump 128. In this case, the outer end of the cold-water return line 120 is placed directly in the cold-water sump 128 of the cooling tower 124. The outer end of the liquid feed line 122 is then placed into the cold-water basin 126 of the fixed tower at a point spaced a considerable distance from the cold-water sump 128.

In this case, liquid then is drawn directly out of the basin 126 into the auxiliary cooling tower 10 and after having passed through the auxiliary cooling tower 10 is fed by means of the return line 120 into the cold-water sump 128 of the fixed four-cell tower.

As hereinbefore stated although the auxiliary cooling tower is of a significantly smaller size than any one cell of the fixed tower 124, the auxiliary tower operates at such a high pressure, it can typically provide all of the cooling necessary to temporarily replace one entire cell of the fixed tower 124.

Figure 11:
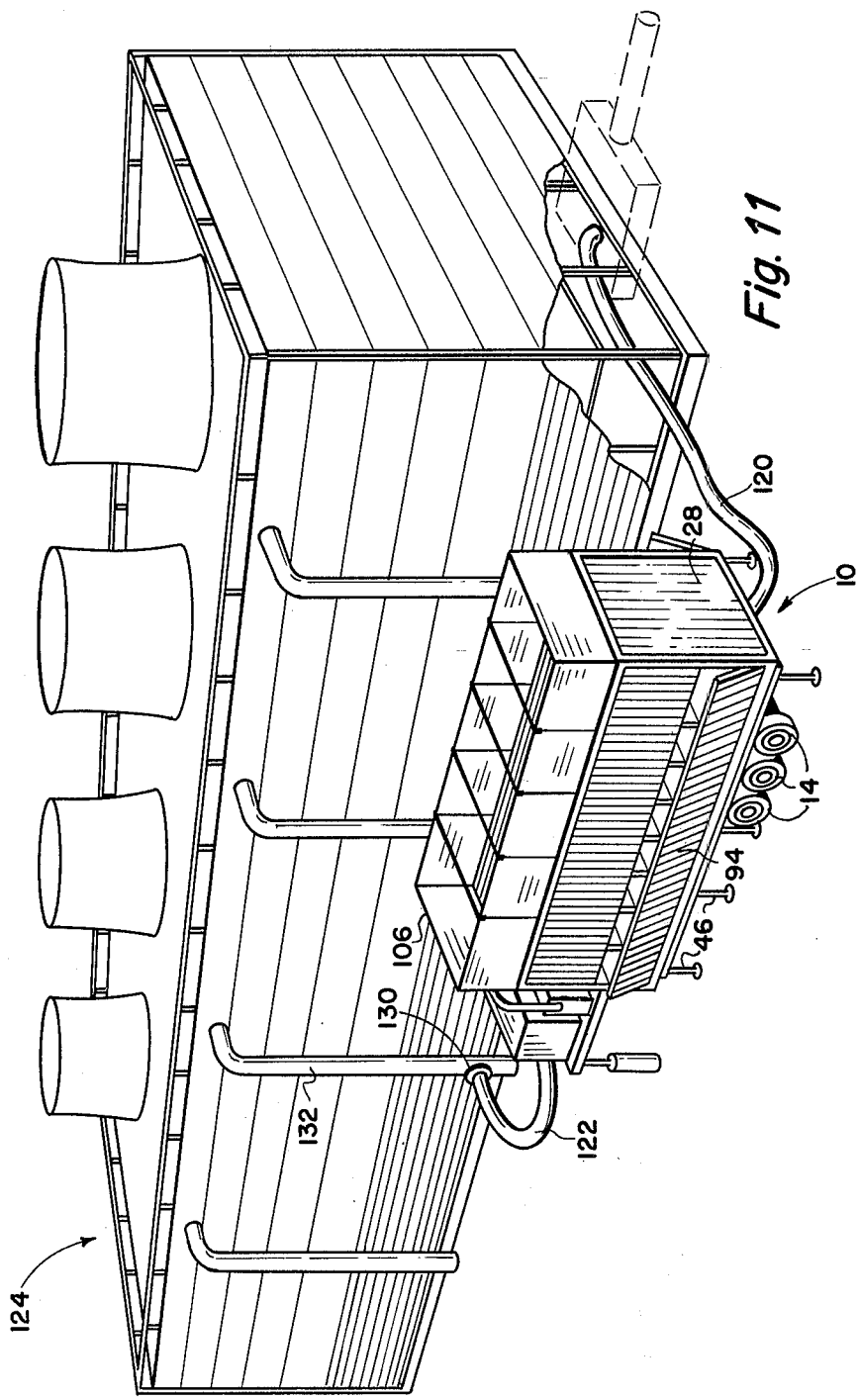
FIG. 11 is a perspective view depicting the tower in a third mode of operation.

Referring now to FIG. 11, the auxiliary cooling tower 10 is shown alongside the four-cell fixed tower 124, but in this case the outer end of the liquid feed line 122 is provided with an adapter 130 for attaching the feed line directly to a hot-water riser pipe 132 of the fixed tower. This permits the auxiliary cooling tower to operate off of the hot-water system of the fixed tower 124 as opposed to pulling relatively cooler water out of the basin 126. This system would be particularly adaptable in the case where a particular cell of the fixed tower is broken down or undergoing maintenance operations.

Referring now to FIG. 12, the auxiliary cooling tower 10 is depicted alongside a four-cell fixed cooling tower 134 which is equipped with a hot-water manifold system 136. In this case, a liquid accumulation box 138 is attached to the manifold 136 for allowing hot water to flow into and accumulate within the box 138. The outer end of the liquid feed line 122 is then attached to the box 138 and extends down into the liquid contained in that box so that hot water can be taken directly out of the manifold, passed through the auxiliary cooling tower 10 and then returned by way of the return line 120 to the cold-water sump for the fixed tower. The accumulator box 138 serves to increase the head so that a constant supply of liquid may be fed into the auxiliary cooling tower.

From the foregoing it is apparent that the present invention provides an auxiliary cooling tower which is portable and even mobile so that it may be attached to a suitable tractor or pulling device and moved along the highways with ordinary traffic to the site where it is needed for use.

Whereas, the present invention has been described in particular relation to the drawings attached hereto, other and further modifications apart from those shown or suggested herein may be made within the spirit and scope of the invention.

What is claimed is:

1. A portable auxiliary cooling tower for performing cooling and aerating of liquids comprising:
   (a) a housing having shape and size compatible for movement with traffic along the highways without disassembly, air intake ports along each side of the housing, air outlet ports along the top of the housing, a frame member for supporting the housing and a plurality of wheels axially supported by the frame suitable for movement along the highways;
   (b) a plurality of closely spaced blowers carried within an upper portion of the housing for pulling outside air through the intake ports and expelling the air through the outlet ports;
   (c) packing provided within the housing between the inlet and outlet ports for filming the liquid being cooled and aerated;
   (d) a liquid distribution system for pulling liquid into the housing and distributing the liquid to the packing;
   (e) drift eliminator means provided in the outlet ports for stripping liquid from the air after it has passed through the packing;
   (f) liquid expulsion system for removing the cooled aerated liquid; and
   (g) leveling means carried by the frame and contactable with the ground for leveling and adjusting elevation at the site.

2. An auxiliary cooling tower as set forth in claim 1 wherein the air intake ports comprise at least one louver panel along each side of a lower portion of the housing, each said louver panel being hinged for selected outward opening when in use and being retractable against the housing to form a part of the housing when the tower is not in use.

3. An auxiliary cooling tower as set forth in claim 2 wherein each louver panel is hinged along the bottom thereof, said panel being openable to a selected desired position to shield against the introduction of dust and debris from the ground around the auxiliary cooling tower.

4. An auxiliary cooling tower as set forth in claim 3 wherein the louver panels are shorter than the height of the air intake ports to leave a gap when closed.

5. An auxiliary cooling tower as set forth in claim 2 and including a plenum chamber in communication with the air intake ports through said louver panel and an elongated vertically disposed windbreak panel extending the entire length of said plenum chamber and being centrally located therein for eliminating loss of water and cooling efficiency by preventing high cross winds from traveling through said plenum chamber.

6. An auxiliary cooling tower as set forth in claim 1 and including a pair of oppositely disposed sidewall front and rear extension panels carried by the top of the housing and hinged around the periphery of the top of the housing to prevent re-circulation of the outlet air back into the intake ports and for effectively extending the height of the cooling tower while in use.

7. An auxiliary cooling tower as set forth in claim 6 wherein the extension panels are foldable to cover the entire top of the housing when not in use and when the tower is being transported.

8. An auxiliary cooling tower as set forth in claim 1 wherein the liquid expulsion system comprises a basin in the bottom of the housing and at least one gravity outlet sump located in the lowest most part of the basin and wherein said leveling means comprise a plurality of vertically movable locks for positioning the elevation of the housing and outlet sump to a liquid source.

9. An auxiliary cooling tower as set forth in claim 8 wherein the gravity outlet sump comprises a recessed cavity located at each end of the basin and being connectable to flexible liquid outlet hoses, said outlet sump comprising one or more outlet ports in the bottom of the recessed cavity.

10. An auxiliary cooling tower as set forth in claim 1 wherein the liquid distribution system comprises a liquid pump, flexible inlet hose, means for connecting the hose to a source of liquid to be cooled and aerated, a plurality of spray nozzles above the packing, and distribution header means for routing the liquid to the nozzles, said distribution header being longitudinally positioned below the packing for effecting precooling of the liquid prior to movement thereof to the nozzles.

11. An auxiliary cooling tower as set forth in claim 1 wherein the drift eliminator means comprises a plurality of longitudinally arranged blades, the upper portion of each of the blades being transversely offset from the lower portion so that the air flow is directed to one side off the vertical for directing the exhaust air from the outlet ports upwardly and to one side.

* * * * *